United States Patent [19]

Grube

[11] Patent Number: 5,325,424
[45] Date of Patent: Jun. 28, 1994

[54] METHOD OF AUTOMATICALLY ESTABLISHING A COMMUNICATION PATH BETWEEN TWO DEVICES

[75] Inventor: Gary W. Grube, Palatine, Ill.

[73] Assignee: Motorola, Inc., Schaumburg, Ill.

[21] Appl. No.: 58,846

[22] Filed: May 10, 1993

Related U.S. Application Data

[63] Continuation of Ser. No. 688,767, Apr. 22, 1991, abandoned.

[51] Int. Cl.⁵ .......................................... H04M 11/00
[52] U.S. Cl. .................................... 379/94; 379/201; 379/216; 379/142
[58] Field of Search ....................... 379/94, 95, 96, 97, 379/98, 216, 201, 142

[56] References Cited

U.S. PATENT DOCUMENTS

| | | |
|---|---|---|
| 4,266,098 | 5/1981 | Novak . |
| 4,658,416 | 4/1987 | Tanaka . |
| 4,723,273 | 2/1988 | Diesel et al. . |
| 4,759,056 | 7/1988 | Akiyama ............................. 379/197 |
| 4,763,350 | 8/1988 | Immendorfer et al. ............. 379/216 |
| 4,893,336 | 1/1990 | Wuthnow . |
| 4,899,373 | 2/1990 | Lee et al. ............................ 379/216 |
| 4,941,167 | 7/1990 | Cannalte et al. . |
| 5,012,511 | 4/1991 | Hanle et al. ......................... 379/201 |
| 5,181,238 | 1/1993 | Medamana et al. ................. 379/94 |
| 5,204,894 | 4/1993 | Darden ................................ 379/216 |
| 5,222,120 | 6/1993 | McLeod et al. ..................... 379/216 |

OTHER PUBLICATIONS

EDN Magazine, Mar. 1, 1991, "ISDN-Based Concurrent Design" –Markowit–discloses the basics of ISDN topology and operation, as well as various application categories: desktop conferencing, networking, and supplementary services.

The Bell System Technical Journal, vol. 61, No. 5, May–Jun., pp. 816–861–discloses several new custom calling services offered by the Bell System, among them a feature referred to as "Speed Calling". The general architecture used for these features is also disclosed.

Primary Examiner—Curtis Kuntz
Assistant Examiner—Stella L. Woo
Attorney, Agent, or Firm—James A. Coffing; Joseph P. Krause; Steven G. Parmelee

[57] ABSTRACT

A method is disclosed which automatically establishes a communication path between at least two devices (106, 110, 118, 120, 128). Each device has a unique identification (ID), and is coupled to a switching center (132-137) of a Public Switched Telephone Network (PSTN, 130). The PSTN (130) has a facility access center (FAC, 140) for coupling the switching centers (132-137) to a storage facility controller (SFC, 146), which provides access to a central storage facility (148). The method includes the steps of determining (306) an ID of a first device and then selecting (318) a portion of the central storage facility (148) associated with that ID. Then, after ascertaining a second ID of a second device, an element associated with the second ID is retrieved (322) from that portion of the central storage facility (148). Lastly, a communication path is created (327, 328) between the first device (106, 110, 118) and the second device (108, 112, 128).

18 Claims, 3 Drawing Sheets

METHOD OF AUTOMATICALLY ESTABLISHING A COMMUNICATION PATH BETWEEN TWO DEVICES

This is a continuation of application Ser. No. 07/688,767, filed Apr. 22, 1991 and now abandoned.

FIELD OF THE INVENTION

The present invention relates generally to public-switched telephone network (PSTN) communication systems, and more particularly to establishing a communication path between two devices within such a system.

BACKGROUND OF THE INVENTION

As telecommunications equipment and networks become more readily available, there is increased usage among subscribers, of these devices and services. This is especially true in the world-market business scene, which continues to expand along with the technology. More people, it would seem, are communicating with each other more often, and in more ways. Consider the introduction of nationwide paging services, mobile cellular phones, personal portable cellular phones, pay cellular phones, interconnect trunking radio systems, fax machines and the multitude of simpler cordless telephones. As these various communications devices are used, care must be taken to keep track of the correlation between who is being called and that individual's phone number (or any unique access number associated with a person or machine). Even if one person, or machine, could always be associated with a single access number, the list of frequently called numbers would be far too great to be retained in human memory. Humans simply can't remember their favorite 20-100 frequently called phone numbers.

To assist the forgetful human, many of these telecommunications devices (e.g., phones) have a built in memory and speed-dial function. Maintaining the same list, however, in each of these devices is inconvenient, if not impossible. For example, a single person may have a work phone, a home phone, a cordless phone, a mobile phone, a portable cellular phone and a trunked radio (i.e., having interconnect capabilities), each having varied memory capacities and entry formats. As frequently happens in the life of a busy person, a new, frequently called number surfaces which then must be programmed into each of the aforementioned telecommunications devices. Not only is such a task inconvenient due to inconsistencies between entry formats, but even worse, is subject to errors during entry. Some of these devices store by numbers alone, some by alpha names and numbers, and some by spoken names. Furthermore, the addition of the memory system (particularly the storage/retrieval hardware required to access that memory) adds extra, and often substantial, cost to these devices. The problem is one of redundant entry and storage of common numbers in each phone device "database". If one wishes to make a call (e.g., on the public switched telephone network, or PSTN), and only has access through a foreign phone device such as a pay phone, then the multitude of independent personal phone device databases are rendered useless.

One possible solution to the aforementioned problem is to carry the database with you (i.e., an electronic telephone directory). Such electronic directories are readily available, but tend to create additional problems in terms of ease of access and dialing (e.g., some display the number for the human to dial, while others have an acoustic DTMF dialer). Further, it is rarely convenient to carry on ones person one of these electronic telephone directories, as they tend to be rather bulky, depending on the amount and type of information that is being stored.

Accordingly, a dire need exists for a centrally located personal directory that one can use to speed-dial frequently called access numbers. Such capability should be provided from any access point in the global telephone system.

SUMMARY OF THE INVENTION

The present invention encompasses a method of establishing a communication path between at least two devices. Each device has a unique identification (ID), and is coupled to a switching center of a Public Switched Telephone Network (PSTN). The PSTN has a facility access center (FAC) for coupling the switching centers to a storage facility controller (SFC), which provides access to a central storage facility. The method includes the steps of determining an ID of a first device and then selecting a portion of the central storage facility associated with that ID. Then, after ascertaining a second ID of a second device, an element associated with the second ID is retrieved from that portion of the central storage facility. Lastly, a communication path is created between the first device and the second device.

DETAILED DESCRIPTION OF A PREFERRED EMBODIMENT

Figure 1:
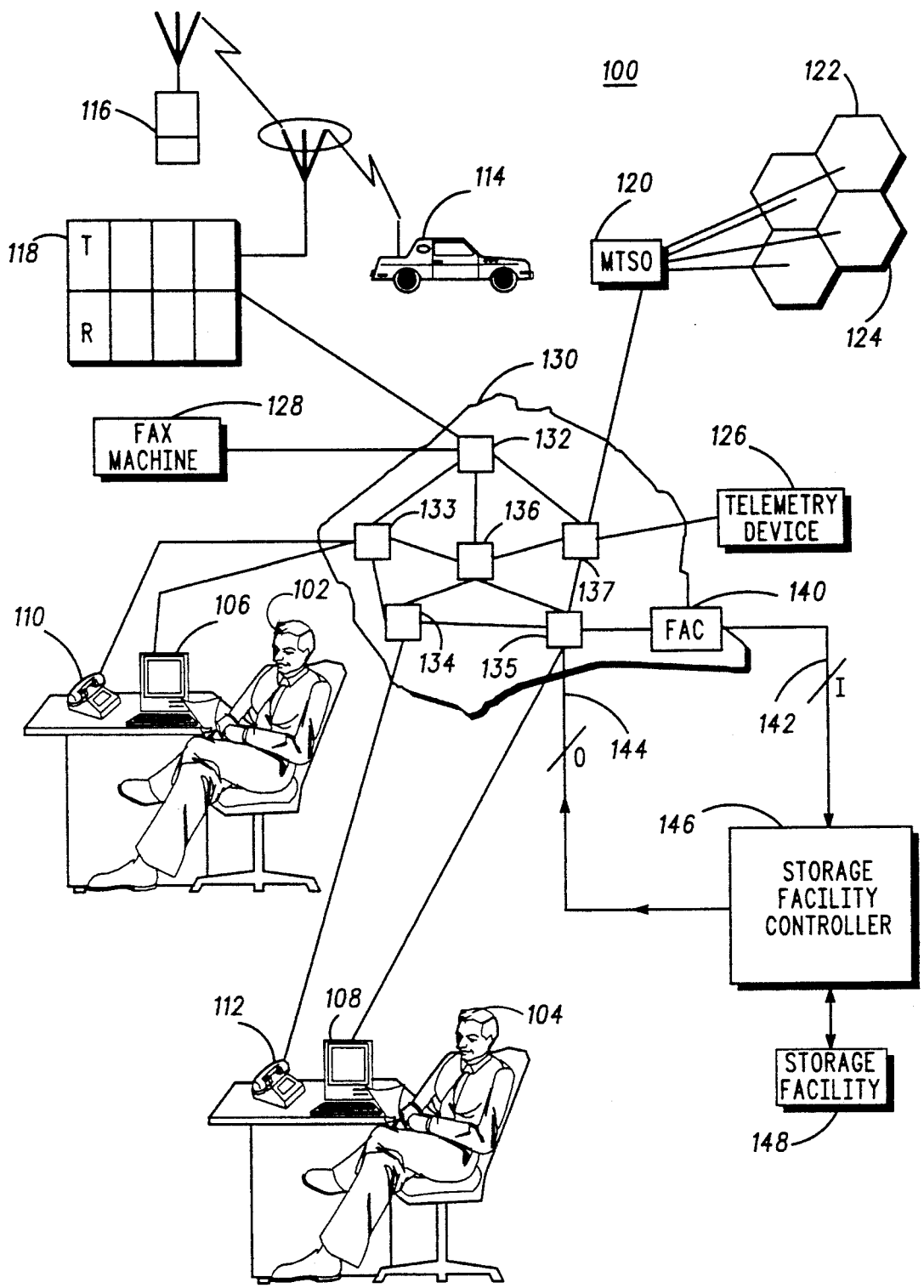
FIG. 1 is a simplified block diagram and graphical representation of one embodiment of the present invention.

FIG. 1 shows a simplified block diagram 100 of one embodiment of the present invention. Through the use of the public switched telephone network (PSTN) 130 and the use of a facility access center (FAC) 140, it is feasible for a multitude of system users to employ a central storage facility 148 for storing frequently called numbers. Having such capabilities, it would be possible for an individual 102 to, without being required to carry a personal telephone directory device, automatically initiate a communication with another individual 104, or device 108, that is wired-in to the PSTN 130. Also, this would be possible using standard switching centers (e.g., 132-137), and existing subscriber equipment. Furthermore, this capability would not be limited to wire-line subscriber equipment such as computers 106, and telephones 110, but rather encompasses all systems (e.g., facsimile machine 128, radio system 118, cellular system 120, and telemetry device 126) that are tied in to the PSTN 130. A conventional or trunked radio system 118, which has interconnect capability, allows users of portable radio 116 and mobile radio 114 to communicate with others in the system 100. Similarly, users within cellular coverage areas 122, 124 are able to, through the use of mobile telephone switching office (MTSO) 120, communicate with other users in the system 100.

The access capability mentioned above is made possible through the use of a storage facility controller (SFC)146 and a network of inbound trunk lines 142 and outbound trunk lines 144. The SFC 146 provides system control, data conversion, and switching. In addition to its control function, SFC 146 serves as a data link to a central storage facility 148, in which elements, generally access or phone numbers, for various devices in the system 100 are stored. Central storage facility 148 effectively replaces all of the independent database devices that are either carried by individuals 102, 104 or that are resident in random access memory (RAM) of machines 110, 116, 128, etc.

Figure 2:
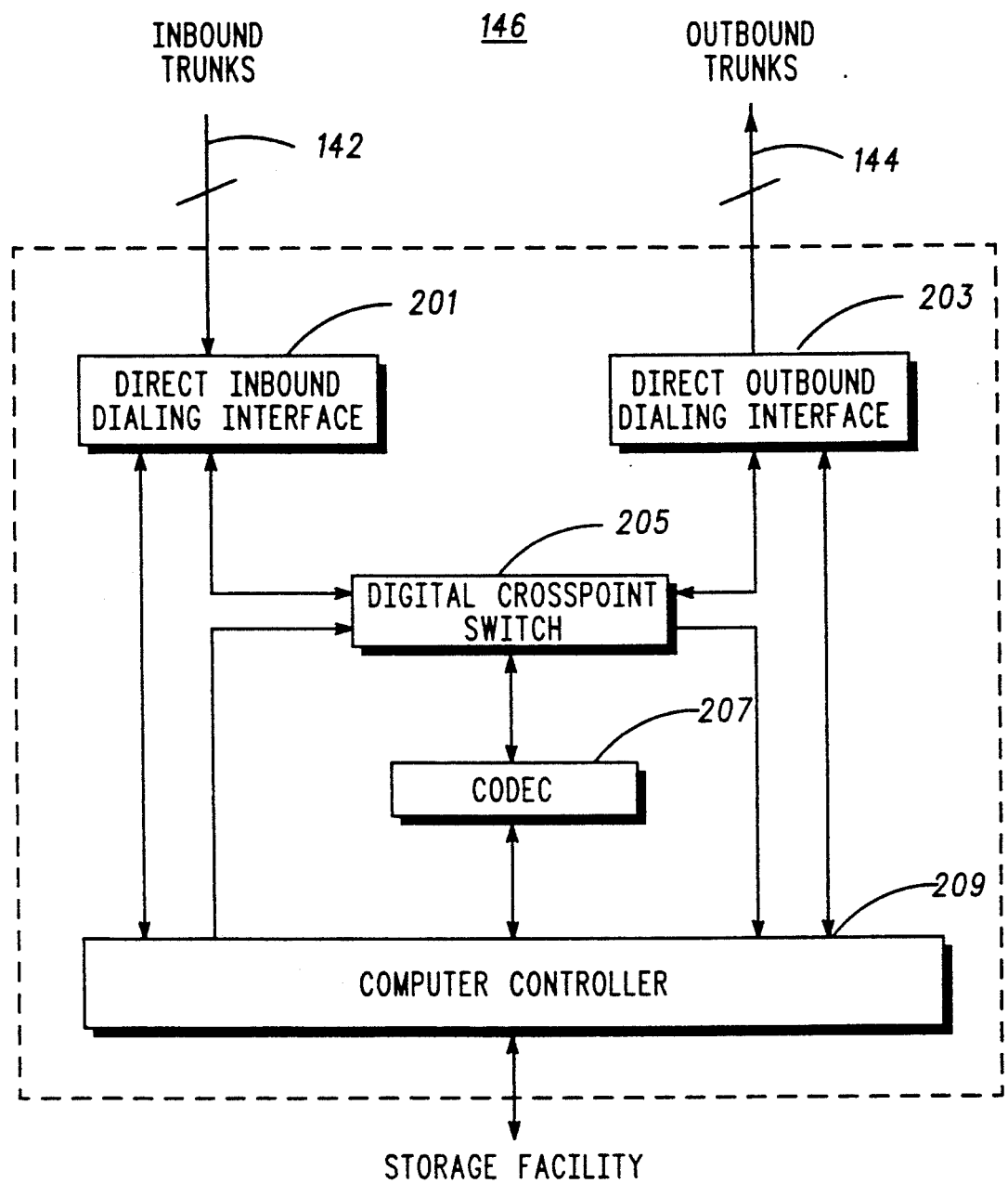
FIG. 2 is a simplified block diagram of the storage facility controller (SFC) shown in FIG. 1.

FIG. 2 shows a more detailed view of the SFC 146 shown in FIG. 1. A direct inbound dialing (DID) interface 201 is used to port the inbound trunks 142 to the SFC 146. Similarly, direct outbound dialing (DOD) interface 203 is used to send signals back out to the PSTN, via outbound trunks 144. These two interfaces 201, 203 act under the control of computer controller 209 and serve as the primary communication link between users in the system 100. Inbound trunks 142, and outbound trunks 144 are, in the preferred embodiment, based on an integrated services digital network (ISDN) service topology. Briefly, an ISDN consists of a bi-directional, 192k-bps digital communications path. This path generally comprises two (for "basic rate" service; "primary rate" service has considerably more than two) 64k-bps channels (referred to as "B" channels) for voice or data, and one 16k-bps channel ("D" channel) for network signalling and control. Additionally, there is approximately 48k bps of channel overhead for framing and error detection. In one embodiment of the present invention, the '23B+D' (23 "B" channels, and one "D" channel) primary rate service is utilized. Such service yields 1.544M-bps of information exchange, which is the North American and Japanese standard for ISDN based systems.

Having ISDN capability allows a greater array of features including automatic number identification (ANI), which allows the system to determine the callers ID the instant connection is made to the PSTN. Also, with ISDN capability, the SFC 146 is not required to create a communications path between the first and the second device via the inbound and outbound trunks 142, 144. This task is handled directly by the PSTN in response to a message, sent by the SFC 146, to transfer the incoming call to the target number. Without ISDN capability, the SFC 146 must use one of the available outbound trunks to access the PSTN, by dialing the target phone number with DOD interface 203. In this case, the digital cross point switch 205 (e.g., Motorola Ambassador Electronic Bank, which has 960 ports, each operating at 64 k-bps) is used to facilitate connection between the inbound and outbound trunks, after the target number is dialed on the outbound trunk.

The invention may be embodied in such a way so as to include, in addition to number storage capability, a list, edit, and browse feature. Entry for these and all features may be entries from a keypad, or spoken words, which are compared against stored strings from previous training or in simple DTMF overdial form. Codec 207, which may be a Motorola part number MC145554, or any equivalent thereof, is used to produce the synthesized speech (for the prompts) and to convert the inbound speech into a form to be used by the speech recognition process (embedded in the computer controller 209). Central storage facility 148 is coupled to the computer controller 209 and is used to store all numbers, names, and billing information for the users on the system 100.

Figure 3:
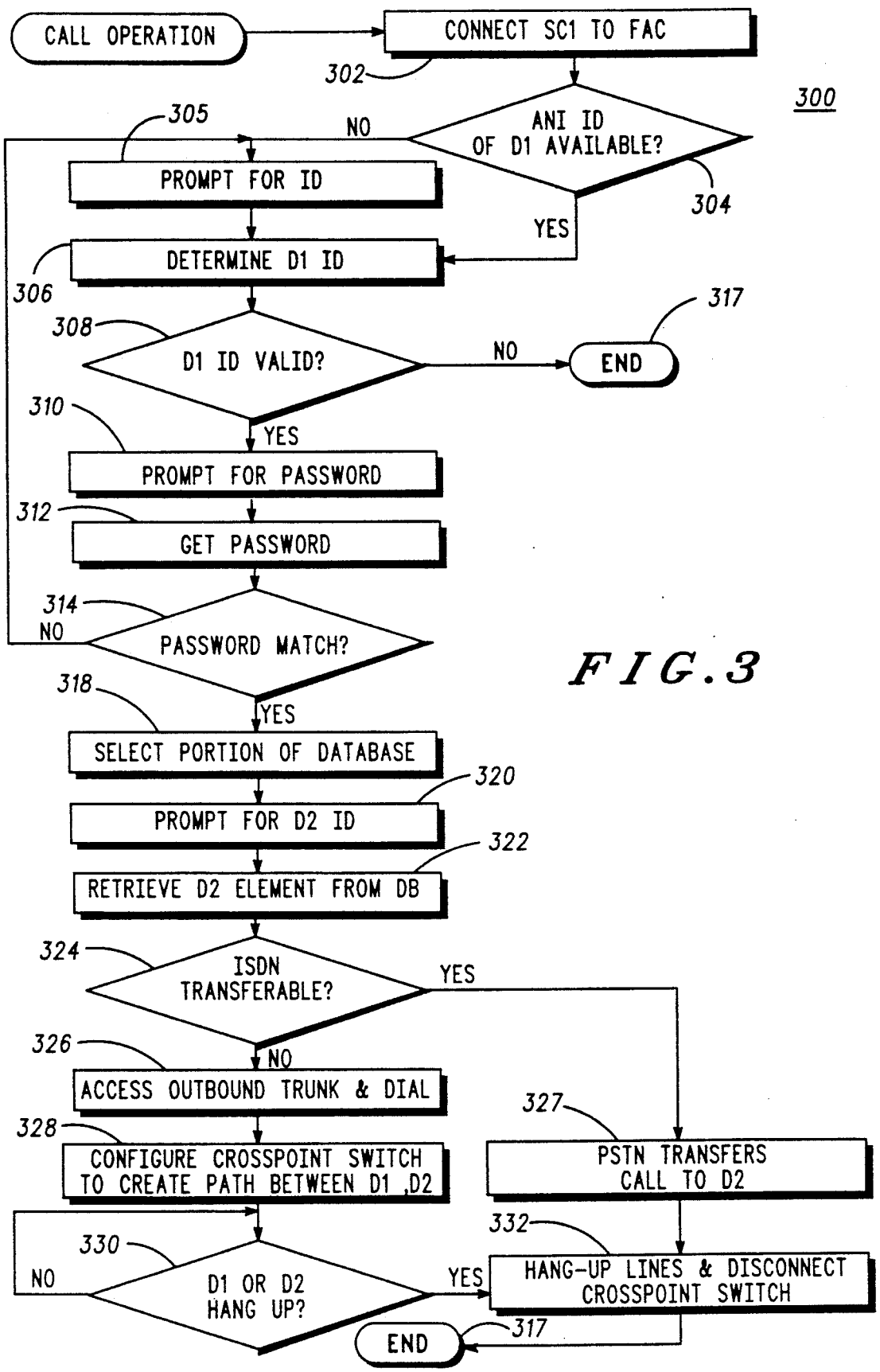
FIG. 3 is a simplified flow diagram showing a call operation sequence, in accordance with the present invention.

FIG. 3 shows a simplified flow diagram of the call operation 300 in accordance with one embodiment of the present invention. For purposes of describing the operation, the term "caller" will be used to identify the individual, or machine, initiating the communication. The term "target" will be used to represent the individual, or machine, with which communication is presently being sought by the caller. The operation begins when the caller picks up the handset and a connection is made at 302 between the switching center, which is hard-wired to the device being used by the caller, and the FAC 140. A decision is then reached at 304 in which it is determined whether or not automatic number identification (ANI) capability exists on the system. If no such capability exists, and the ID of the caller is not automatically available, the system prompts at 305 the caller for his identification code. The system then determines at 306 the identification of D1, either by ANI, speech recognition, or DTMF tone decoding. A decision is then reached at 308 where it is determined whether or not the caller ID is valid. If the ID is determined to be invalid, the routine is exited at 317. If the ID is a valid one (e.g., the system recognizes the ID) the system then prompts the caller for a password at 310. The system then gets the password at 312, before reaching another decision at 314 which determines whether or not the password matches that of the stored password for this particular caller. If the password does not match the system again prompts the user for an ID at 305. If there is a match, the computer controller 209 then selects at 318 a portion of the database which is reserved for this caller. The caller is then prompted at 320 for a target ID, and the computer controller then retrieves at 322 an element from the portion of the database associated with the caller ID. A decision is then reached at 324 which determines whether or not the call is ISDN transferrable. If ISDN capability exists, the system sends a message to the PSTN telling it to transfer at 327 the call to the target phone number retrieved in step 322. The routine is then exited at 317. If no ISDN capability exists, the computer controller 209 then accesses at 326 an outbound trunk line 144 and dials the target ID retrieved in step 322 using the DOD interface 203. The digital cross point switch 205 is then configured at 328 in order to create the communication path between the caller and the target. The communication carries on in a normal fashion, during which time decision 330 determines whether or not the caller or target has signalled a hang-up to end the communication. If not, the routine continues to loop back to decision 330 to determine the end of the communication. If a hang-up is detected, the trunk lines 142, 144 are hung-up and the crosspoint switch 205 is disconnected at 332, before the routine is exited at 317.

What is claimed is:

1. A method of automatically establishing a communication path between at least two devices having unique identifications (ID) and each being coupled to a switching center of a Public Switched Telephone Network (PSTN), the PSTN further having a facility access center for coupling the switching centers to a storage facility controller which accesses a central storage facility, the central storage facility being divided into portions and containing elements therein, the method comprising the steps of:

establishing a connection between a first switching center coupled to a first of the at least two devices and the facility access center;

determining a first ID of said first device;

selecting a first portion of the central storage facility, said first portion being associated with said first ID;

ascertaining a second ID associated with a second of the at least two devices;

retrieving an element of said first portion of the central storage facility, said element being associated with said second ID; and presently creating, using the retrieved element, a communication path between said first device and said second device.

2. A method of automatically establishing a communication path in accordance with claim 1 wherein said step of establishing a connection further comprises the step of automatically sending, from the first device, a code associated with the facility access center.

3. A method of automatically establishing a communication path in accordance with claim 1, wherein said step of determining further comprises the step of obtaining, via automatic number identification (ANI), said first identification.

4. A method of automatically establishing a communication path in accordance with claim 1, wherein said step of ascertaining further comprises the step of decoding signals received from said first device.

5. A method of automatically establishing a communication path in accordance with claim 4, wherein said step of decoding further comprises the step of processing speech signals.

6. A method of automatically establishing a communication path in accordance with claim 4, wherein said step of decoding further comprises the step of processing data signals.

7. A method of automatically establishing a communication path in accordance with claim 1, wherein said step of creating a communication path further comprises the step of connecting an inbound trunk from the PSTN to an outbound trunk.

8. A method of automatically establishing a communication path between at least two devices having unique identifications (ID) and each being coupled to a switching center of a Public Switched Telephone Network (PSTN), the PSTN further having a facility access center for coupling the switching centers to a storage facility controller which accesses a central storage facility, the central storage facility being divided into portions and containing elements therein, the method comprising the steps of:

sending, from the first device, a code associated with the facility access center;

determining, via automatic number identification (ANI), a first ID of a first of the at least two devices;

selecting a first portion of the central storage facility, said first portion being associated with said first ID;

ascertaining a second ID of a second of the at least two devices;

retrieving an element of said first portion of the central storage facility, said element being associated with said second ID;

sending a message, from the facility access center, to the PSTN; and presently providing a connection between a first switching center coupled to the first device and a second switching center coupled to the second device.

9. A system for automatically establishing a communication path between at least two devices having unique identifications (ID) and each being coupled to a switching center of a Public Switched Telephone Network (PSTN), the PSTN further having a facility access center for coupling the switching centers to a storage facility controller which accesses a central storage facility, the central storage facility being divided into portions and containing elements therein, the system comprising:

means for establishing a connection between a first switching center coupled to a first of the at least two devices and the facility access center;

means for determining a first ID of said first device;

means for selecting a first portion of the central storage facility, said first portion being associated with said first ID;

means for ascertaining a second ID of a second of the at least two devices;

means for retrieving an element of said first portion of the central storage facility, said element being associated with said second ID; and means, at the facility access center, for creating a communication path which carries communication signals between said first device and said second device.

10. A system for automatically establishing a communication path in accordance with claim 9, wherein said element further comprises a PSTN telephone number.

11. A system for establishing a communication path in accordance with claim 9, wherein said communication signals further comprise encoded voice signals.

12. A system for automatically establishing a communication path in accordance with claim 9, wherein said communication signal further comprise data signals.

13. A method of automatically establishing a communication path between at least two devices having unique identifications (ID) and each being coupled to a switching center of a Public Switched Telephone Network (PSTN), the PSTN further having a facility access center for coupling the switching centers to a storage facility controller which accesses a central storage facility, the central storage facility being divided into portions and containing elements therein, the method comprising the steps of:

establishing a connection between a first switching center coupled to a first of the at least two devices and the facility access center;

determining a first ID of said first device;

selecting a first portion of the central storage facility, said first portion being associated with said first ID and including a predetermined list of target IDs;

ascertaining at least one of the target IDs from said predetermined list, said at least one target ID being associated with a second of the at least two devices;

retrieving an element of said first portion of the central storage facility, said element being associated with said at least one target ID; and presently creating, using the retrieved element, a communication path between said first device and said second device.

14. A method of automatically establishing a communication path between at least two devices having unique identifications (ID) and each being coupled to a switching center of a Public Switched Telephone Network (PSTN), the PSTN further having a facility access center for coupling the switching centers to a storage facility controller which accesses a central storage facility, the central storage facility being divided into portions and containing elements therein, the method comprising the steps of:

sending, from the first device, a code associated with the facility access center;

determining, via automatic number identification (ANI), a first ID of a first of the at least two devices;

selecting a first portion of the central storage facility, said first portion being associated with said first ID;

ascertaining a second ID of a second of the at least two devices;

retrieving an element of said first portion of the central storage facility, said element being associated with said second ID;

sending a message, from the facility access center, to the PSTN; and presently providing, using ISDN topology, a connection between a first switching center coupled to the first device and a second switching center coupled to the second device.

15. A system for presently establishing a communication path between at least two devices having unique identifications (ID) and each being coupled to a switching center of a Public Switched Telephone Network (PSTN), the PSTN further having a facility access center for coupling the switching centers to a storage facility controller which accesses a central storage facility, the central storage facility being divided into portions and containing elements therein, the system comprising:

means for establishing a connection between a first switching center coupled to a first of the at least two devices and the facility access center;

means for determining a first ID of said first device;

means for selecting a first portion of the central storage facility, said first portion being associated with said first ID;

means for ascertaining a second ID of a second of the at least two devices;

means for retrieving an element of said first portion of the central storage facility, said element being associated with said second ID; and switching means for presently creating a communication path between said first device and said second device.

16. The system of claim 15, wherein said means for determining a first ID comprises ANI circuitry.

17. The system of claim 15, wherein said switching means comprises a crosspoint switch.

18. The system of claim 15, wherein said means for ascertaining a second ID comprises means for selecting, from a predetermined list of target IDs, the second ID.

* * * * *